United States Patent [19]

Teel

[11] 4,209,766

[45] Jun. 24, 1980

[54] TRANSDUCER

[75] Inventor: Willis A. Teel, Panama City, Fla.

[73] Assignee: The United States of America as represented by the Secretary of the Navy, Washington, D.C.

[21] Appl. No.: 397,366

[22] Filed: Sep. 15, 1964

[51] Int. Cl.[2] .......................... G01V 1/00; H04B 13/00; H04R 15/00

[52] U.S. Cl. ...................................... 367/155; 310/337

[58] Field of Search ................ 340/10, 8, 8 C, 8 MM, 340/8 PC, 9, 12, 8 R; 310/8.6, 9, 9.6, 331, 337

[56] References Cited

U.S. PATENT DOCUMENTS

| | | | |
|---|---|---|---|
| 2,694,868 | 11/1954 | McMillan et al. | 340/10 X |
| 2,930,912 | 3/1960 | Miller | 340/10 X |

*Primary Examiner*—Theodore M. Blum

*Attorney, Agent, or Firm*—Louis A. Miller; Rolla N. Carter; Don D. Doty

EXEMPLARY CLAIM

1. A transducer comprising in combination,
   a plurality of piezoelectric discs arranged along a common axis of revolution in the order of increasing diameters in the aft to forward direction,
   resilient means interposed between each of said piezoelectric discs for the support thereof with a predetermined relative degree of freedom of movement,
   means effectively connected to the end ones of said piezoelectric discs for the urging thereof toward each other by compressing the resilient support means interposed therebetween and in such manner as to maintain the entire plurality thereof in a predetermined unitary geometrical configuration, and
   means connected to each of said plurality of piezoelectric discs for the driving thereof in electrical parallel.

16 Claims, 7 Drawing Figures

TRANSDUCER

The invention described herein may be manufactured and used by or for the Government of the United States of America for governmental purposes without the payment of any royalties thereon or therefor.

The present invention relates generally to energy conversion transducers and in particular is a reversible electroacoustical transducer for converting electrical energy into acoustical energy that is proportional thereto and vise versa. Even more specifically, it is a reversible electroacoustical transducer that will both broadcast and receive broadband acoustical energy within a predetermined frequency range while submerged in a subaqueous medium.

In the past, electroacoustical transducers have incorporated various and sundry stacks of piezoelectric elements which, when electrically energized, broadcast acoustical energy in a manner somewhat comparable to the way the instant invention does. Although said prior art devices are ostensively imminently satisfactory for many practical purposes, none is known to yield resonant frequency sensitive across a broad frequency operating band of the order of twenty to eighty kilocycles per second. Furthermore, the devices of the prior art apparently will not satisfactorily operate continuously at a radiation sound power of 90 decibells (dba) (reference 1 microbar at 3 feet) uniformly over a substantially hemispherical or other radiation pattern.

The instant invention overcomes many of the disadvantages of the prior art, especially for its particular intended operation, in that it is an exceptionally broadband, high power, efficient, and rugged transducer that may be operated at very high ambient environmental pressures.

it is, therefore, an object of this invention to provide an improved broadband electroacoustical transducer.

Another object of this invention is to provide a reversible transducer that may be reliably operated as both a transmitting and receiving means at considerable ocean depths.

Still another object of this invention is to provide a method and means of broadcasting sonic energy within an aqueous medium at a continuous sound power of 90 dba, referenced at one microbar at three feet.

A further objective of this invention is to provide an improved method and means of broadcasting sonic energy substantially uniformly over a predetermined radiation pattern at frequencies within the twenty to eighty kilocycle per second frequency range.

Another object of this invention is to provide a reversible electroacoustical transducer that may readily be towed by any suitable predetermined vehicle and that will maintain a relatively stable attitude and properly operate acoustically while so disposed.

Still another object of this invention is to provide an electroacoustical transducer that presents substantially a uniform resistive load to its driving means across the entire operating frequency band.

Still another object of this invention is to provide a transducer that produces predetermined operational results while it is being subjected to ambient pressures of the order of five hundred pounds per square inch, as a result of being submerged in deep sea water or the like.

Another object of this invention is to provide a rugged, efficient, portable transducer that is easily and economically manufactured, operated, and maintained.

Other objects and many of the attendant advantages will be readily appreciated as the subject invention becomes better understood by reference to the following detailed description when considered in conjunction with the accompanying drawings wherein.

Figure 2:
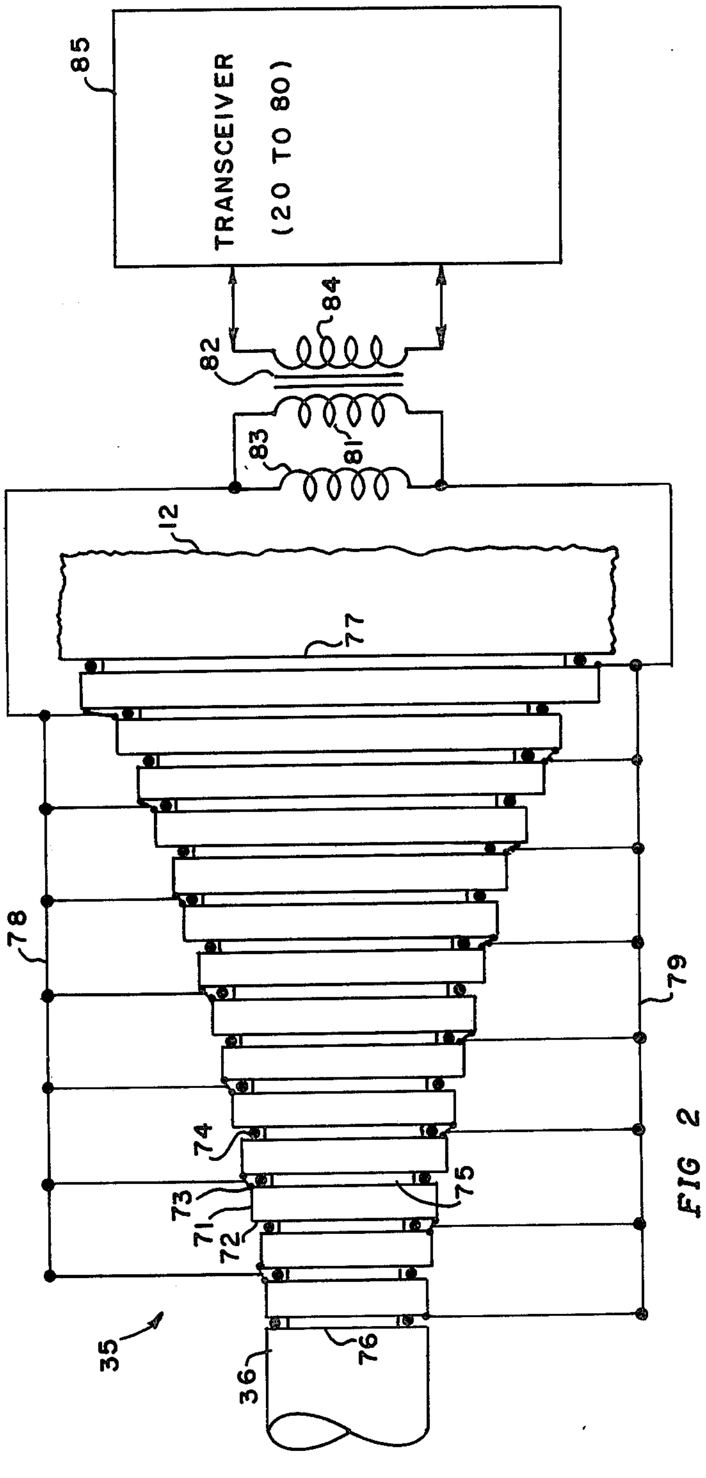
FIG. 2 is an enlarged view of the array of piezoelectric crystal elements of the device of FIG. 1.
Figure 3:
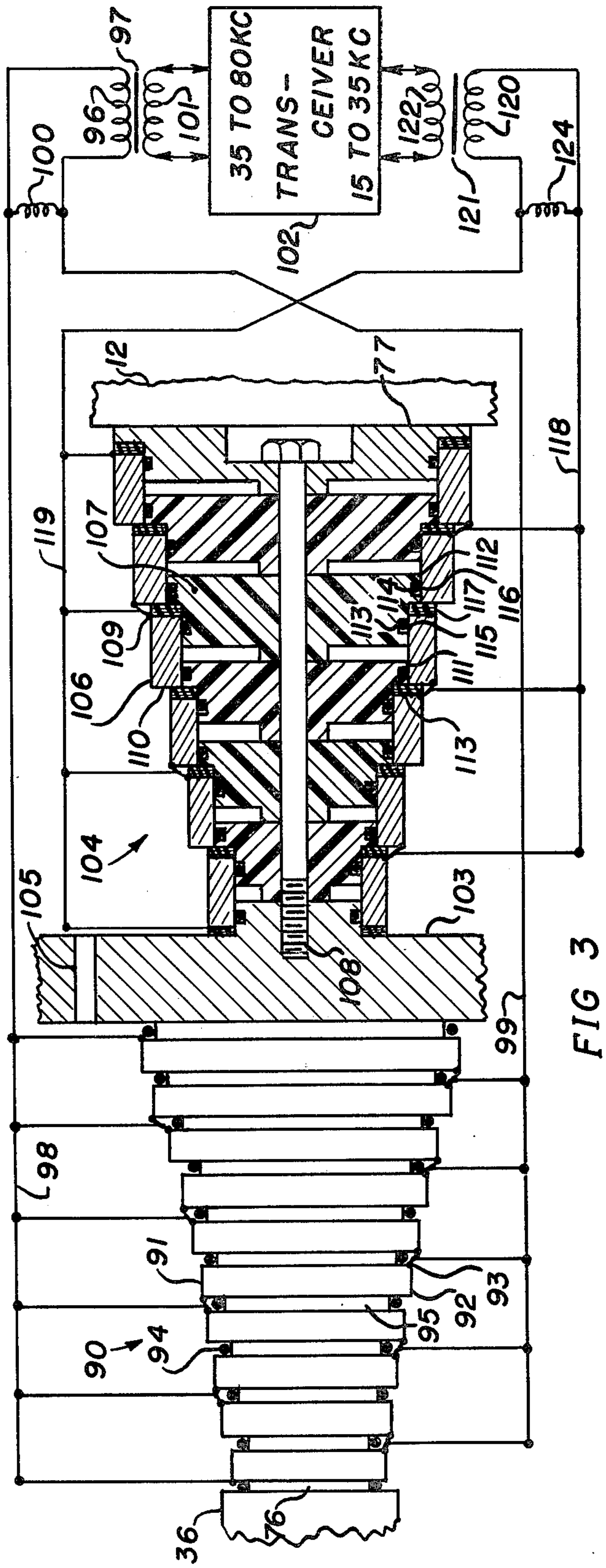
FIG. 3 is another species of an array of piezoelectric converter elements that may be substituted as a unit for the converter unit of the device of FIG. 1.
Figure 4:
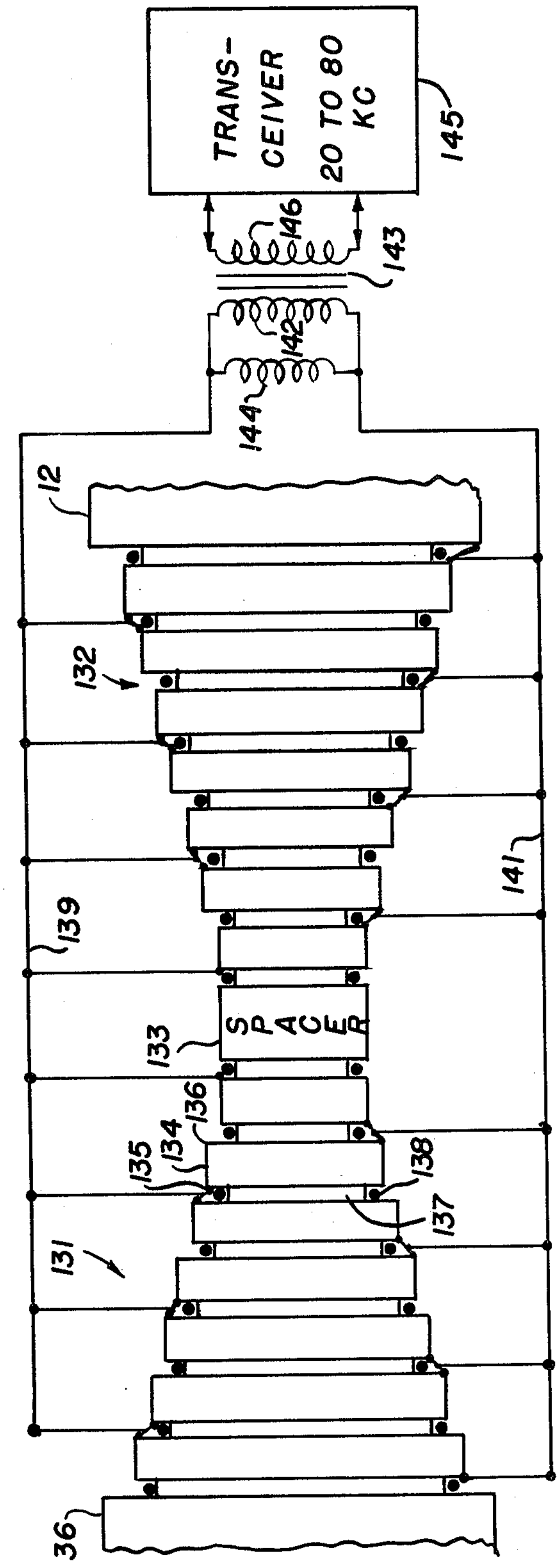
FIG. 4 is still another species of an array of piezoelectric converter elements that may be substituted as a unitary assembly for the converter assembly of the device of FIG. 1.
Figure 7:
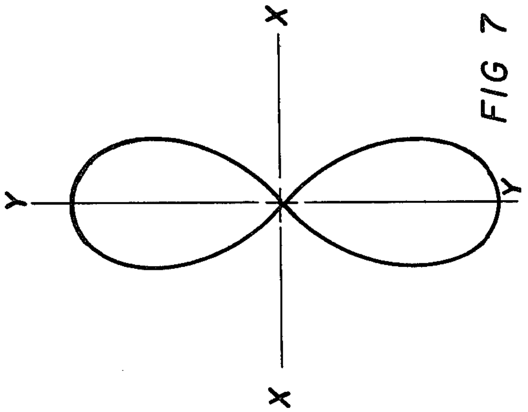
Figure 6:
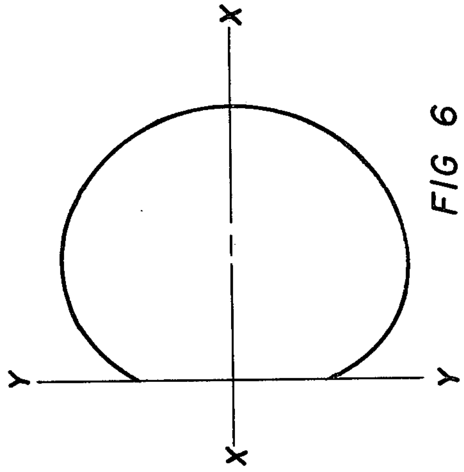

FIG. 6 is an ideal graphical representation of the type of acoustical radiation pattern that may be obtained from the subject invention when either of the converter units of FIGS. 2 or 3 are incorporated therein; and FIG. 7 is an ideal graphical representation of the type of acoustical radiation pattern that may be obtained from the subject invention when the converter unit of FIG. 4 is incorporated therein.

Figure 1:
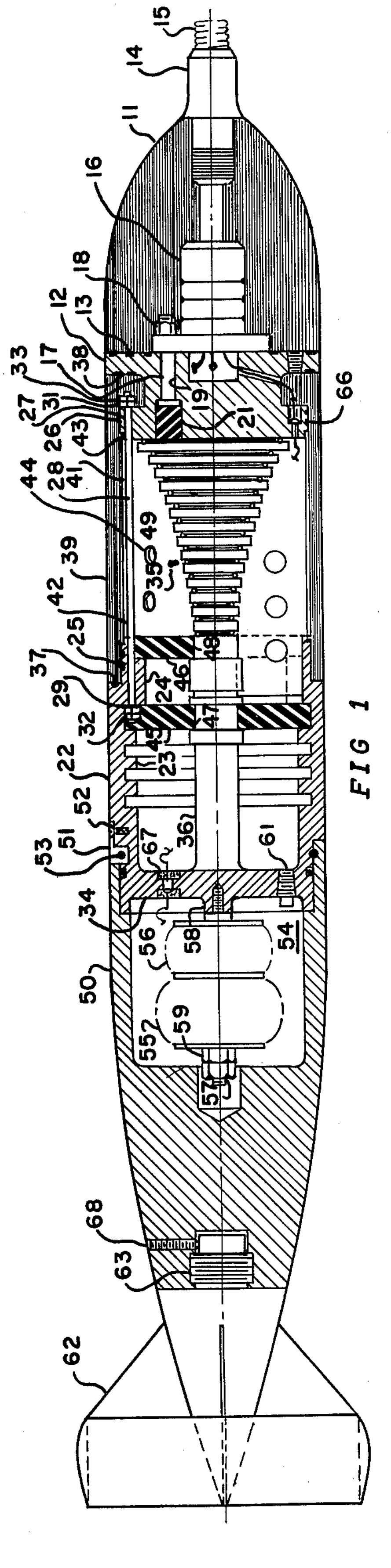
FIG. 1 is an elevational view of the subject invention, shown partially in cross-section and partially in pictorial form.

Referring now to FIG. 1, the invention is shown as having a molded nose case section 11, preferably made of an acoustically clear material such as rubber or the like with a forward plate 12 attached thereto by means of vulcanizing 13. Disposed in nose section 12 is a cable fitting 14, to which is connected a combination power supply and towing cable 15, the other end of which is connected to any suitable transmitter and/or receiver located in any appropriate towing vessel, such as a ship, submarine boat, aircraft, or the like.

Also attached to said towing cable and mounted within said rubber nose section is a flanged tow fitting 16 that is securely attached to the aforesaid forward plate 12 by means of any conventional connecting means, such as one or more bolts 17 and nuts 18. As may be seen, bolts 17 extend through holes 19 with the bolt heads abutting the inner end of a recessed portion 21 thereof.

An intermediate ease section 22 includes a plurality of annular inner cutouts so as to form heat exchange fins 23. Also included therein is a forward flange 24, having a hole 25 disposed therethrough, which is bolted to a rear flange 26, at forward plate 12, likewise having holes 27 extending therethrough, by means of studs 28, sealing washers 29 and 31 and nuts 32 and 33.

Intermediate case section 22 has a rear end plate 34 integrally attached thereto, and interposed between rear end plate 34 and the aforesaid forward plate 12 is an energy converter assembly 35 and a spacer 36. Also interposed between a forward shoulder 37 of intermediate case section 22 and a flanged section 38 of forward plate 12 is a rubber boot 39. In addition, if so desired, an aluminum boot liner 41 may be inserted between shoulders 42 and 43 of casing 22 and rear flange 26, and said liner has a plurality of holes 44 disposed at various predetermined locations therein.

At predetermined locations along the longitudinal axis of spacer 36 and within intermediate case section 22, a pair of SOAB rubber sound attenuation baffles 45 and 46 are disposed. The SOAB rubber material of which these baffles are made is manufactured by the Goodrich Rubber Company of Akron, Ohio, and it is considered to be preferable in this embodiment for the purpose of effecting the desired radiation pattern of the subject invention; however, it should be understood that any other suitable material may be so used, if desired. As may be seen, baffles 45 and 46 contain center apertures 47 and 48, respectively, through which spacer 36 extends for relative support and disposition purposes, and also, if so desired, may contain one or more fluid passageways, as well.

Disposed within the chamber comprising the space between the inner surface of boat liner 41 and the external surfaces of energy converter unit 35 is an acoustically clear, electrically non-conductive fluid 49 such as, for example DB-Grade Castor Oil, manufactured by the Baker Caster Oil Company of Bayonne, New Jersey.

A rear casing section 50 of aluminum or other suitable metal is attached to intermediate casing section 22 by a joint lock 51 held in place by set screw 52. Longitudinal movement therebetween is prevented by Teflon ring 53 inserted in complementary grooves therein.

Located in a forward chamber portion 54 of rear casing 50 is a power transformer 55 and an impedance matching coil 56 electrically connected in parallel with the secondary winding thereof. The primary winding thereof is, of course, connected to any suitable broadband transmitting apparatus adapted for energizing converter 35, and the secondary winding thereof is connected to said converter 35, as will be explained in more detail subsequently. In this particular preferred embodiment, transformer 55 and coil 56 are firmly mounted on a stud 57 that has one end thereof screwed in a threaded hole 58 located in end plate 34. Nuts 59 and 60 secure transformer 55 and coil 56 in their firmly mounted position on stud 57. As illustrated in FIG. 1, the end of stud 57 and perhaps nut 60 extends within an appropriate recessed portion of rear casing 50.

Fluid filler plug 61 is screwed into rear end plate 34, which allows chamber 49 to be filled with the aforesaid castor oil when rear casing 50 is removed.

A replaceable tail fin assembly 62 of any suitable, conventional design is mounted on the aft end of casing 50 by means of a screw threaded extension 63 which is screwed into a complementary threaded recess 64 in casing 49 and held there by an appropriate set screw 65.

From an electrical standpoint, electrical conductors from cable 15 preferably connect each of the piezoelectric elements of converter 35 in parallel after being coupled through the aforesaid transformer 55 and coil 56. This means, of course, that various insulated electrical conductors must extend through various walls and plates, etc., and that either appropriate apertures or perhaps insulators, such as, for example, insulators 66 and 67, may be respectively employed for such purposes.

Referring now to FIG. 2, there is shown a preferred piezoelectric converter assembly and its electrical circuitry which may be incorporated in the subject invention as converter 35 and its associated electrical components. As may be seen, said converter assembly comprises a stacked plurality of piezoelectric elements 71 which are preferably cylindrical in shape. Each of said piezoelectrical elements are physically similar except for size, and in the instant geometrical configuration, they are identical in thickness but increase in diameter from aft to front in accordance with the resonance frequency response characteristics desired during any given operational circumstances. Piezoelectric cylinders 71 are herein disclosed as preferably being made of polarized solid lead zirconate; however, it should be understood that such preference is not intended to be limiting, inasmuch as it would be well within the purview of one skilled in the art to properly substitute discs of barium titanate or any other appropriate piezoelectric substance. It should also be understood that any suitable number of piezoelectric discs may be used that will provide the desired power, radiation pattern, and operational frequency range. An example of lead zirconate disc sizes which have been found to operate satisfactorily within the twenty to eighty kilocycle per second frequency range are listed in the following table in the order of increasing diameter:

| Diameter | Thickness |
|---|---|
| 1.10 inches | .250 inch |
| 1.20 inches | .250 inch |
| 1.30 inches | .250 inch |
| 1.40 inches | .250 inch |
| 1.50 inches | .250 inch |
| 1.60 inches | .250 inch |
| 1.75 inches | .250 inch |
| 1.90 inches | .250 inch |
| 2.125 inches | .250 inch |
| 2.25 inches | .250 inch |
| 2.50 inches | .250 inch |
| 2.70 inches | .250 inch |
| 3.00 inches | .250 inch |
| 3.50 inches | .250 inch |
| 4.00 inches | .250 inch |

Piezoelectric discs 71 are each silvered to form electrodes 72 and 73 on their parallel flat surfaces and are polarized across the thickness dimension. O-rings 74 of the order of 1/16" are placed in between adjacent discs for separation and acoustic isolation thereof along the longitudinal axis of the stack of discs.

A plurality of fibre washers 75 of Synthane, manufactured by the Synthane Corporation of Oaks, Penn., or other suitable material, are respectively disposed between piezoelectric discs 71 and within o-rings 74. The respective outside diameters of said washers should preferably be substantially complementary with the inside diameters of said o-rings for the optimum radial support thereof so that collapse thereof will be prevented when they are exposed to operational pressures. In addition to preventing o-ring collapse, said washers also limit the maximum displacement of the stack of piezoelectric elements in the axial direction when subjected to maximum hydrostatic pressures and mounting pressures, when the entire stack of discs 71 is squeezed by its end support means, which in this particular embodiment, is intended to be inner ends 76 and 77 of spacer 36 and forward plate 12, respectively. The amount of squeezing pressure should be enough to provide fluid sealing characteristics between the o-rings and the piezoelectric discs and thus prevent the castor oil from getting in between them. Although only one of each of the foregoing elements have herewith been described for the purpose of keeping this disclosure as simple as possible, obviously FIG. 2 illustrates that a number of such elements are similarly arranged, with the number thereof being a matter of design choice of the artisan and thus selected in accordance with optimum operational requirements for any given operational conditions.

Each of piezoelectric discs 71 are electrically connected in parallel as a result of electrical conductors 78 and 79 being effectively connected to the opposite silvered electrode surfaces of each thereof. Conductors 78 and 79 are also connected to a secondary winding 81 of a power transformer 82 and an impedance matching coil 83 is likewise connected across primary winding 81 thereof. A primary winding 84 of transformer 82 is coupled to a transceiver 85, which, in this particular case, constitutes either a drive—transmitter or a receiver, or both, which operates within a frequency band of the order or twenty to eighty kilocycles per second.

The electroacoustical energy conversion transducer assembly depicted in FIG. 3 is another exemplary species of the type that may be substituted for converter element 35 in the device of FIG. 1. Hence, it, too, would be interposed in any suitable manner between the facing surfaces 76 and 77 of spacer 36 and forward end plate 12. The aft end portion of this transducer element consists of an energy converter unit 90 somewhat similar to the device of FIG. 2, in that it consists of a plurality of solid, polarized, stacked, piezoelectric discs 91 of lead zirconate, barium titanate, or any other suitable piezoelectric material. The flat surfaces thereof are likewise silvered to form integral electrodes 92 and 93 therewith. Interposed between adjacent discs are an o-ring 94 of rubber, neoprene, or other suitable material, and a fibre washer 95 of Melamine or the like, with the respective sizes and spacings thereof selected according to design principles used in the construction of the device of FIG. 2. As may readily be seen, the diameters of the piezoelectric discs increase from aft to forward in such manner as to provide a predetermined range of resonance characteristics that enable acoustical energy to be propagated and received within said frequency range. In this particular embodiment, the respective piezoelectric disc sizes are intended to be such that the frequency range coverage is from thirty-five to eighty kilocycles per second, although, obviously, other frequency ranges may be selected, if so desired.

Accordingly, discs 91 of converter unit 90 are electrically connected in parallel and to a secondary winding 96 of an appropriate power transformer 97 by means of electrical conductors 98 and 99. A coil 100 is connected in parallel with said secondary winding 96 for impedance matching purposes, so as to make the transducer loading approach a pure resistance type load. A primary winding 101 of transformer 97 is connected to the 35 to 80 kc per second portion of transceiver 102.

An intermediate support member 103 is disposed between the aforesaid converter unit 90 and another electroacoustical converter unit 104 adapted for operation within the fifteen to thirty-five kilocycle per second frequency band. Support member 103 may be made of any suitable material such as aluminum or plastic, as expedient for any given operational or manufacturing circumstances, and it may be designed so as to fit within the inside diameter of the transducer hull at any predetermined location in a manner similar, for example, to baffles 45 and 46. One or more holes 105 may optionally extend through support 103 to provide a passage for fluid and electrical conductors between converter unit chambers.

Converter unit 104 consists of a stacked plurality of hollow, polarized, piezoelectric cylinders which get progressively larger in diameter from aft to forward in accordance with the respective resonance characteristics thereof and the frequency range intended to be used during normal operation. In this particular instance, the desired frequency range for unit 104 is fifteen to thirty-five kilocycles per second, so that number and size of piezoelectric cylinders 106 should be selected accordingly. Inasmuch as making such selection is merely a matter of design choice, it is obvious that so doing would be well within the purview of one skilled in the art having the benefit of the teachings herewith presented. Again, piezoelectric cylinders 106 are intended to be made of lead zirconate, but it should be understood that barium titanate or any other piezoelectric material having the proper polarization may be substituted therefor.

To facilitate the proper positioning and support of cylinder 106, a like number of insulator type stepped spacers 107 are used as shown in FIG. 3. These spacers may be of plastic or Teflon, and they have a hole through their respective centers which allows them to be securely bolted to the aforesaid support member 103 by means of a bolt 108. The screw threads thereof are, of course, screwed into a complementary internal threaded portion of support 103. Support 103 has a forward extending boss with the outer diameter thereof such that it will fit within the inner diameter of the aft-most piezoelectric cylinder.

As with solid piezoelectric cylinders 91 of converter unit 90, hollow piezoelectric cylinders 106 have both sides of each thereof respectively silvered to provide energizing electrodes 109 and 110.

Each of spacers 107 has a pair of stepped diametrical portions 111 and 112 which are of such dimension as to fit into the inside diameter of adjacent piezoelectric cylinders, as said piezoelectric cylinders increase in size in the aft to forward direction. A pair of peripheral grooves 113 and 114 are disposed in each of steps 111 and 112, respectively, and a pair of resilient o-rings 115 and 116 of rubber, neoprene, or the like, are inserted in said grooves in such manner and under such pressure as to effect fluid seals between the respective spacer steps and piezoelectric cylinders of the entire electroacoustical energy converter unit. Likewise, respectively disposed between adjacent piezoelectric cylinders and between the end cylinders and support member 103 and end plate 12 are a plurality of rubber washers 117 of suitable size to effect fluid seals therebetween, while allowing sufficient relative movement to occur therebetween, especially in the radial direction, for the proper operation thereof.

Like solid piezoelectric cylinders 91 in electroacoustical energy converter unit 90, the dimensions of hollow piezoelectric cylinders 106 are respectively selected to include aft to forward increasing diameters which, in turn, provide them with resonance characteristics which cover the operational frequency range desired. In this particular preferred embodiment, the frequency range chosen is fifteen to thirty-five kilocycles per second; consequently, cylinders 106 are intended to be sized accordingly. Obviously, so doing would be well within the purview of one skilled in the art having the teachings herewith presented, and, also, it would obviously be a matter of design choice of the artisan to select some other frequency range and the proper size of hollow piezoelectric cylinders to cover it, if so desired.

The hollow piezoelectric cylinder elements of converter 104 are electrically connected in parallel by conductors 118 and 119, which are coupled to a secondary winding 120 of a transformer 121. A primary winding 122 of transformer 121 is connected to a fifteen to thirty-five kilocycle per second portion of transceiver 102. A coil 124 is connected in parallel with secondary winding 119 for impedance matching purposes, so as to make converter unit 104 appear as a resistive load.

Transceiver 102 is herein shown as being a single device which either transmits or receives electrical energy at the designated frequencies; however, it should be understood that separate transmitters and/or receivers may also be employed without violating the scope or spirit of this invention.

FIG. 4 illustrates another preferred embodiment of a type of electroacoustical converter unit that may be substituted for converter unit 35 in the transducer device of FIG. 1. In this embodiment a pair of converter units 131 and 132 are disposed between spacer 36 and end plate 12 in mirror image fashion, with any appropriate conventional variable spacer 133 interposed therebetween. Of course, it should be understood that various sizes of fixed spacers may be used instead of variable spacer 133, if preferred.

Although oppositely arranged, converter units 131 and 132 are similar in structure; therefore, in view of the simple illustration in FIG. 4, only unit 131 will be discussed in order to simplify this disclosure as much as possible. As may readily be seen, a plurality of varying size solid piezoelectric cylinders or discs 134 are aligned along a common longitudinal axis of revolution. In this particular embodiment said discs decrease in diameter from aft to forward up to spacer 133 and then increase in diameter up to forward plate 12. Each of said piezoelectric discs have their parallel sides silvered to effect electrodes 135 and 136 thereat, respectively.

Interposed between adjacent discs and end supports 36 and 12 are fibre washers 137, and spatially disposed therearound are o-rings 138. Said washers may be made of Synthane and said o-rings may be made of rubber or any other suitable resilient material.

The piezoelectric discs of both converter units 131 and 132 are electrically connected in parallel by means of conductors 139 and 141 which, in turn, are coupled to a secondary winding 142 of a transformer 143. Connected in parallel with winding 142 is a coil 144 of such inductance as to effect impedance matching and thereby cause the entire electroacoustical converter assembly to appear as a resistive load to its driver or signal source. In this case, said driver or signal course is a transceiver 145, adapted for transmitting and receiving electrical energy within the twenty to eighty kilocycle per second frequency range or some other predetermined frequency range. Electrical coupling, of course, is made by connecting transceiver 145 to a primary winding 146 of transformer 143.

Briefly, the operation of the subject invention is discussed now in connection with all FIGS.

Figure 5:
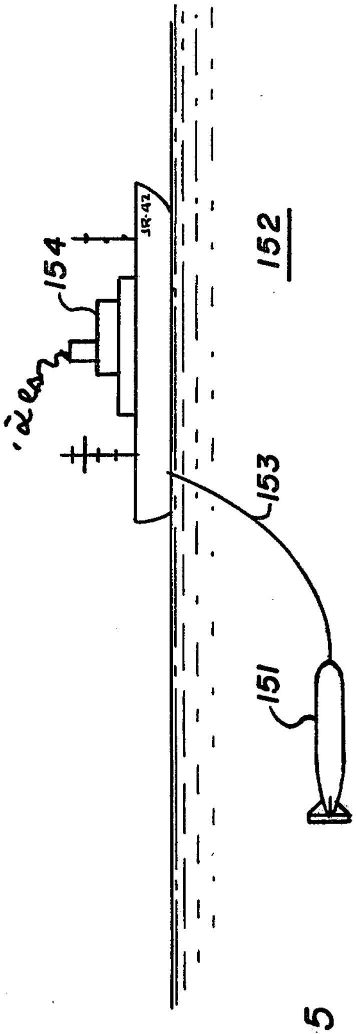
FIG. 5 is a schematic pictorial representation of a typical mode of operation of the subject invention.

As a general rule, the transducer constituting this invention is towed as an underwater transducer 151 within sea water 152 or the like by a combination electrical and mechanical cable 153 connected to a ship 154, as is schematically illustrated in FIG. 5. However, although preferable to use it in such manner, it should be obvious to the skilled artisan that other configurations and other environments would be operable as well. For example, as previously mentioned, the towing vessel may be a submarine boat instead of a ship. Or, perhaps it may be an aircraft of some suitable type which tows the subject transducer either in water or an atmospheric environment. It is considered preferable to have the towing vessel carry the transceiver, but if so desired, it may be incorporated in the hull of the transducer, thereby making it a self-contained unit.

In the transmit mode of operation, electrical power is fed down cable 153 to each disc of the converter unit. The voltage is applied to the silvered electrode surfaces thereof which causes the discs to vibrate radially outward and inward at their particular excitation frequency, respectively. At resonance, each disc vibrates at maximum amplitude to effect production of maximum sound output. If and when groups of discs are simultaneously energized, the phase of the voltage is such as to cause the braodcast beam to tilt toward the forward end of the entire converter unit. Thus, the subject transducer is driven and caused to broadcast proportional acoustical energy within the twenty to eighty kilocycle per second frequency band throughout a substantially predetermined radiation pattern within the sea water or other aqueous medium. The radiation pattern obtained is, of course, contingent on the converter configuration used. For instance, the converter units of FIGS. 2 and 3 produce radiation patterns somewhat comparable to the idealized substantially hemispherical pattern shown in FIG. 6, and the converter unit of FIG. 4 produces a radiation pattern somewhat comparable to the idealized pattern of FIG. 7. Varying the amount of space between the individual discs and/or the individual converter units of the device of FIG. 4 will, of course, vary the radiation pattern accordingly. With respect to both FIGS. 6 and 7, the X-X axes are considered to be coincident with the axis of revolution of the converter unit involved and the Y-Y axes normal thereto. Furthermore, as can be seen from FIG. 6, the electroacoustical energy converters of FIGS. 2 and 3 project their acoustical energy, for the most part, in a forwardly direction in a somewhat hemispherical radiation pattern, while the electroacoustical energy converter of FIG. 4, projects its acoustical energy as loop-like radiation patterns in a radial direction about the Y-Y axis.

In the receiving operational mode, the reverse affect occurs. The impinging sound pressure causes the piezoelectric discs to vibrate which, in turn, produces a voltage at the electrodes silvered on the opposite faces thereof. This voltage is then fed to the transceiver or some other pertinent utilization apparatus for use thereby.

Obviously, many modifications and other embodiments of the subject invention will readily come to the mind of one skilled in the art having the benefit of the teachings presented in the foregoing description in accompaniment with the associated drawings. Therefore, it is to be understood that the invention is not to be limited thereto and that said modification and embodiments are intended to be included within the scope of the appended claims.

What is claimed is:

1. A transducer comprising in combination, a plurality of piezoelectric discs arranged along a common axis of revolution in the order of increasing diameters in the aft to forward direction, resilient means interposed between each of said piezoelectric discs for the support thereof with a predetermined relative degree of freedom of movement, means effectively connected to the end ones of said piezoelectric discs for the urging thereof toward each other by compressing the resilient support means interposed therebetween and in such manner as to maintain the entire plurality thereof in a predetermined unitary geometrical configuration, and means connected to each of said plurality of piezoelectric discs for the driving thereof in electrical parallel.

2. A transducer comprising in combination, a first electroacoustical energy converter having a plurality of solid piezoelectric discs disposed in the order of increasing diameters along a common axis of revolution, resilient means interposed between each of the piezoelectric discs of said first electroacoustical energy converter for the support thereof with a predetermined relative degree of freedom of movement, a second electroacoustical energy converter in contiguous relationship with said first electroacoustical energy converter having a plurality of hollow piezoelectric cylinders of increasing diameters disposed along the aforesaid common axis of revolution, means disposed within and connected to each of said hollow piezoelectric cylinders of said second electroacoustical energy converter for the support thereof with a predetermined relative degree of freedom of movement, means effectively connected to opposite ends of said first and second electroacoustical energy converters for the support thereof as a unitary geometrical configuration, and means connected to each of said solid piezoelectric discs of said first electroacoustical energy converter and to each of said hollow piezoelectric cylinders of said second electroacoustical energy converter for the electrical energization thereof in parallel.

3. The device of claim 2 wherein said means connected to each of said solid piezoelectric discs of said first electroacoustical energy converter and to each of said hollow piezoelectric cylinders of said second electroacoustical energy converter for the electrical energization thereof in parallel comprises, a plurality of electrodes each of which is respectively connected to the fore and aft surfaces of each of said solid piezoelectric discs and hollow piezoelectric cylinders, and electrical conductors connected to said plurality of electrodes for effectively connecting each of said discs and cylinders in electrical parallel.

4. The invention according to claim 3 further characterized by a transceiver connected to said electrical conductors.

5. The device of claim 2 wherein said resilient means interposed between each of the piezoelectric discs of said first electroacoustical energy converter for the support thereof with a predetermined relative degree of freedom of movement comprises, a fibre washer, and a rubber o-ring surrounding said fibre washer in contiguous disposition therewith.

6. The device of claim 2 wherein said means disposed within and connected to each of said hollow piezoelectric cylinders of said second electroacoustical energy converter for the support thereof with a predetermined relative degree of freedom of movement comprises, a plurality of adjacently connected stepped insulative spacers having outside diameters complementary with the inside diameters of the respective hollow piezoelectric cylinders being supported thereby, and a plurality of o-rings effectively interposed between the outside diameters of said plurality of stepped insulative spacers and the inside diameters of said plurality of hollow piezoelectric cylinders respectively.

7. The invention according to claim 6 further characterized by, an intermediate support member effectively mounted between said first and second electroacoustical energy converters.

8. The invention according to claim 7 further characterized by at least one fluid passageway extending through said intermediate support member.

9. The invention according to claim 7 further characterized by means interconnecting said plurality of spacers and said intermediate support member for the holding thereof in substantially a fixed relative relationship.

10. A transducer comprising in combination, a first plurality of piezoelectric discs spatially disposed along a common axis of revolution in an order of decreasing diameters, a second plurality of piezoelectric discs spatially disposed along said common axis of revolution in an order of increasing diameters, electrode means attached to each of said piezoelectric discs adapted for the electrical energization thereof, conductor means connected to each of said electrode means for connecting each of said first and second plurality of piezoelectric discs in electrical parallel, and means connected to each of the discs of said first and second pluralities of piezoelectric discs for the support thereof in a predetermined geometrical configuration.

11. The invention according to claim 9 further characterized by a variable spacer interposed between said first and second pluralities of piezoelectric discs.

12. The device of claim 10 wherein said means connected to each of the discs of said first and second pluralities of piezoelectric discs for the support thereof in a predetermined geometrical configuration comprises, a plurality of fibre washers respectively disposed between each of the discs of said first and second pluralities of piezoelectric discs, a like plurality of o-rings contiguously disposed around each of said washers, and means effectively connected to the outer ends of said first and second pluralities of piezoelectric discs for holding same together as a unitary assembly.

13. A transducer adapted for transmitting and receiving acoustical energy while being submerged within an aqueous medium comprising in combination, an acoustically clear hull, a rubber nose section attached to said hull, a forward plate mounted within said hull adjacent said rubber nose section, a rear plate mounted within said hull in spatial disposition with said forward plate, a spacer attached to said rear plate, an electroacoustical energy converter mounted between and securely supported by said front and rear plates, a rear casing connected to said rear plate, means connected to said rear casing for the attitude stabilization thereof, a plurality of baffles mounted within said hull between said electroacoustical energy converter and said rear plate, acoustical energy conducting fluid means disposed within said hull between said forward and rear plates and in contact with the aforesaid electroacoustical energy converter, and means connected to said electroacoustical energy converter for supplying electrical energy thereto and receiving electrical energy therefrom during the broadcasting and receiving of acoustical energy thereby respectively.

14. A transducer comprising in combination, a plurality of piezoelectric discs respectively having their diameters increased at a predetermined dimensional rate spatially disposed along a common axis of revolution, a plurality of electrodes respectively mounted on the opposite parallel faces of each of said plurality of piezoelectric discs, means connected to said plurality of electrodes for electrically connecting said piezoelectric discs in parallel, a plurality of resilient electrically insulated washers respectively disposed between adjacent ones of said plurality of piezoelectric discs, a like plurality of resilient o-rings contiguously disposed around said plurality of resilient electrically insulating washers and in contact with the electrodes of adjacent piezoelectric discs respectively, and means connected to the end ones of the aforesaid resilient o-rings for urging said piezoelectric discs together along said common axis of revolution.

15. The invention according to claim 14 further characterized by means effectively connected to the aforesaid piezoelectric disc urging means and said discs for the housing thereof as a unitary device.

16. The invention according to claim 15 further characterized by an acoustically clear, electrically non-conductive fluid disposed within said housing means between the inside surface thereof and the peripheral surface of each of said piezoelectric discs.

* * * * *